US008676769B2

(12) United States Patent
Costaglio

(10) Patent No.: US 8,676,769 B2
(45) Date of Patent: Mar. 18, 2014

(54) METHOD FOR DEFRAGMENTING INDEXES IN A RELATIONAL DATABASE AND SYSTEM FOR PERFORMING THE METHOD

(75) Inventor: Marco Costaglio, Rapallo (IT)

(73) Assignee: Siemens Aktiengesellschaft, Munich (DE)

( * ) Notice: Subject to any disclaimer, the term of this patent is extended or adjusted under 35 U.S.C. 154(b) by 513 days.

(21) Appl. No.: 12/430,156

(22) Filed: Apr. 27, 2009

(65) Prior Publication Data

US 2009/0271427 A1 Oct. 29, 2009

(30) Foreign Application Priority Data

Apr. 25, 2008 (EP) ..................................... 08007989

(51) Int. Cl.
*G06F 17/30* (2006.01)

(52) U.S. Cl.
USPC ......................................................... 707/693

(58) Field of Classification Search
USPC .................................. 707/696, 999.206, 693
See application file for complete search history.

(56) References Cited

U.S. PATENT DOCUMENTS 6,745,224 B1 * 6/2004 D'Souza et al. .............. 709/202
2005/0228963 A1 * 10/2005 Rothman et al. ............. 711/170

OTHER PUBLICATIONS

Jones, Steve. "SQL Server—Indexes and Performance," Database Journal—The Knowledge Center for Database Professionals. Oct. 18, 2000. <http://www.databasejournal.com/features/mssql/article.php/1467801/SQL-Server—Indexes-and-Performance.htm> retrieved on May 9, 2011.*
Dibble, Clifford. "SQL Server Engine Tips," MSDN Blogs. Oct. 7, 2005. <http://blogs.msdn.com/b/sqltips/archive/2005/10/07/478462.aspx> retrieved on May 9, 2011.*
Chigrik, "Reducing SQL Server Index Fragmentation," MS SQL City, posted Aug. 11, 2003 (for verification see screenshot from Internet Archive Wayback Machine, and attached Google Search results). Retrieved on Jul. 1, 2013 from http://web.archive.org/web/20030811024344/http://www.mssqlcity.com/Articles/Adm/index_fragmentation.htm.*
Microsoft Download Center: "SQL Server 2005 Books Online (Sep. 2007)", Retrieved by EPO on: Oct. 9, 2008, XP-002495134, Nov. 30, 2007.
SQL Server 2005 Books Online (Sep. 2007): "DBCC Showcontig (Transact-SQL)", XP-002495133, Sep. 15, 2007.
Ruthruff: "Microsoft SGL Server 2000 Index Defragmentation Best Practices", Microsoft TechNet, XP-002495135, Mar. 19, 2003.

* cited by examiner

*Primary Examiner* — Etienne Leroux
(74) *Attorney, Agent, or Firm* — Laurence A. Greenberg; Werner H. Stemer; Ralph E. Locher

(57) ABSTRACT

A method and a system defragment indexes in a relational database. The relational database contains a set of tables, in which each table contains a set of indexes, in which, for each index, a fragmentation parameter is associated indicating the fragmentation level of the index. The method includes the following steps: getting a list of the set of tables; for each table of the list, getting the fragmentation parameter associated to each index of the table; and depending on the value of the fragmentation parameter, defragmenting the associated index.

6 Claims, 1 Drawing Sheet

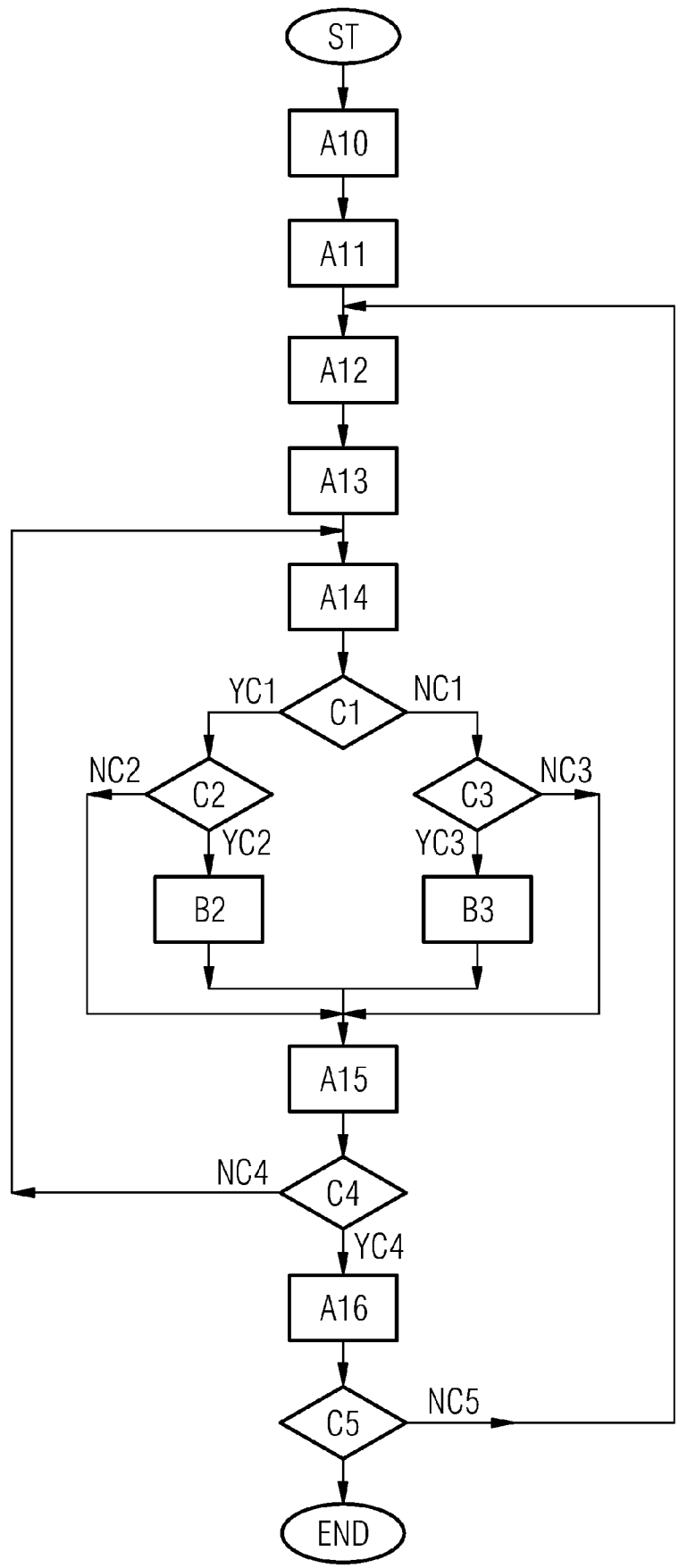

METHOD FOR DEFRAGMENTING INDEXES IN A RELATIONAL DATABASE AND SYSTEM FOR PERFORMING THE METHOD

CROSS-REFERENCE TO RELATED APPLICATION

This application claims the priority, under 35 U.S.C. §119, of European application EP 08 007 989.0, filed Apr. 25, 2008; the prior application is herewith incorporated by reference in its entirety.

BACKGROUND OF THE INVENTION

Field of the Invention

The present invention relates to a method and to a system for defragmenting indexes in a relational database.

A database management system (DBMS) is a set of computer programs configured to control the organization, storage, management, and retrieval of data in a database.

Today, the most common kind of database is a relational database.

A relational database management system (RDBMS) is a DBM system based on the relational model as introduced by E. F. Codd. In brief, in RDBM systems, data is stored in the form of tables and the relationship among the data is also stored in the form of tables.

Thus, the table which stores database data/information is a fundamental database object in a RDBM system. Every database contains one or more tables, each table has its own unique name and contains columns and rows. The database table columns, also called table fields, have their own unique names and have pre-defined data types. Table columns can have various attributes defining the column functionality (the column is a primary key, there is an index defined on the column, the column has certain default value, etc.).

While table columns describe the data types, table rows contain the actual data for the columns.

Here-below follows an example of a simple database table, called Customer Table, containing customers data, in which in the first row, in bold format, the names of the table columns are listed.

| FirstName | LastName | BirthDate | Telephone |
|---|---|---|---|
| John | Smith | Dec. 15, 1968 | 055 465768 |
| Marc | Meyer | Jan. 28, 1974 | 010 638904 |
| Paolo | Rossi | Jun. 01, 1980 | 02 407895 |

In order to speed up queries, indexes are created in existing tables. Indexes cannot be seen by users. Indexes allow locating table rows in a quicker and more efficient way. It is possible to create an index on one or more columns of a table, and each index is given a name. The data rows for each table are stored in a collection of data pages.

The structured query language (SQL) is a database computer language used in RDBM systems and a SQL Server System is a set of components configured to meet the data storage and analysis requirements of enterprises.

Unfortunately, when modifying data of tables, e.g. via INSERT, UPDATE, and DELETE statements, index fragmentation occurs.

In fact, since typically such data modifications are not distributed equally among the table rows, the fullness of each page can vary over time.

Index fragmentation may reduce system performances by causing additional page reads in queries that scan partially or fully a table.

Index fragmentation may have a large variety of negative effects on different workload types. Certain applications may be severely affected when indexes are defragmented.

In order to prevent damages caused by index fragmentation, database administrators usually drop and then rebuild all indexes of all tables without analysing which are the indexes actually requiring defragmentations.

In fact, the task of selecting the indexes to be defragmented is time consuming and thus is not performed systematically as it should.

SUMMARY OF THE INVENTION

It is accordingly an object of the invention to provide a method for defragmenting indexes in a relational database and a system of performing the method which overcome the above-mentioned disadvantages of the prior art devices and methods of this general type, which defragments indexes in a relational database and minimizes human intervention.

The aforementioned aim is achieved by a method and a system for defragmenting indexes in a relational database, the relational database contains a set of tables, in which each table contains a set of indexes, in which, for each index, a fragmentation parameter is associated indicating the fragmentation level of the index. The invention includes the following steps: a) getting a list of the set of tables; b) for each table of the list, getting the fragmentation parameter associated to each index of the table; and c) depending on the value of the fragmentation parameter, defragmenting the associated index.

In embodiments of the invention, the relational database may be a Microsoft SQL Database.

In embodiments of the invention the fragmentation parameter may be the "Logical Scan Fragmentation" parameter obtained by executing the "DBCC SHOWCONTIG" command. In step c), the "Logical Scan Fragmentation" parameter value may be greater than a threshold value contained between circa 10% to circa 35%; and/or the step of defragmenting the associated index at step c) may be performed by executing a "DBCC INDEXDEFRAG" command.

In embodiments of the invention, the fragmentation parameter may be the "Scan Density" parameter obtained by executing the "DBCC SHOWCONTIG" command. In step c), the "Scan Density" parameter value may be lower than a threshold value contained between circa 55% to circa 85%. The step of defragmenting the associated index at step c) is performed by executing a "DBCC DBREINDEX" command; and/or after all indexes of one selected table have been checked, table statistics may be updated by executing an "UPDATE STATISTICS" command.

It is therefore the aim of the present invention to overcome the above mentioned drawbacks, in particular by providing a method and a system for defragmenting indexes in a relational database which minimizes human intervention.

The aforementioned aim of defragmenting indexes in a relational database which minimizes human intervention is also achieved by a method and a system for defragmenting indexes in a relational Microsoft SQL database, the relational database contains a set of tables, in which each table contains a set of indexes, in which, for each index, a "Scan Density" parameter and a "Logical Scan Fragmentation" parameter are associated indicating the fragmentation levels of the index. The invention includes the steps of getting a list of the set of tables from the INFORMATION_SCHEMA.TABLE SQL server system view; for each table of the list, getting the "Scan Density" parameter and a "Logical Scan Fragmentation" parameter associated to each index of the table by executing the "DBCC SHOWCONTIG" command; in case of online index defragmentation mode, depending on the value of the "Logical Scan Fragmentation" parameter, for each index of each table, defragmenting the associated index by executing "DBCC INDEXDEFRAG" command; and in case of offline index defragmentation mode, for each index of each table, depending on the value of the "Scan Density" parameter, defragmenting the associated index by executing "DBCC DBREINDEX" command.

In embodiments of the proposed invention, the "Logical Scan Fragmentation" parameter value may be greater than a threshold value contained between circa 10% to circa 35%; and/or the "Scan Density" parameter value may be lower than a threshold value comprised between circa 55% to circa 85%.

The proposed invention may be preferably implemented in software.

The proposed invention, by maintaining a good health of table indexes, improves the performances of applications using relational databases.

The proposed invention increases RDBMS availability so that data can be faster retrieved by the user.

The proposed invention allows saving time due to the fact index fragmentation is automatically performed.

Other features which are considered as characteristic for the invention are set forth in the appended claims.

Although the invention is illustrated and described herein as embodied in a method for defragmenting indexes in a relational database and a system of performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a flowchart which schematically illustrates an algorithm according to an example embodiment of the invention.

DETAILED DESCRIPTION OF THE INVENTION

According to the present invention, the following actions are executed in a relational database: getting a list of the set of tables of the relational database; for each table of the list, getting the fragmentation parameter, indicating the fragmentation level, associated to each index of the table; and for each index of each table, depending on the value of the fragmentation parameter, defragmenting the associated index.

The FIGURE of the drawing shows a flowchart schematically illustrating an algorithm of an example embodiment of the present invention for a Microsoft SQL relational database. Microsoft SQL relational database commands are described in the Microsoft SQL Server Books Online.

At start step ST, the algorithm is started.

At step A10, a list of the tables of the database is gathered. Such a table list is obtained by reading the RDBM system catalog. By system catalog is denoted the set of tables, maintained by the SQL Server, with information about all the objects, data types, constraints, configuration options, and resources available to the SQL Server.

This table list is retrieved from INFORMATION-SCHEMA.TABLES SQL Server system view. This is the SQL Server table that contains all the table names of a certain database.

The below example returns all the table names of a database called PUBS:

USE PUBS
SELECT * FROM INFORMATION_SCHEMA.TABLES

At step A11, the first table of the table list is selected.

At step A12, a list of the set of "Index Name" indexes, i.e. the internal physical indexes, relative to the selected table are retrieved.

At step A13, the first index is selected.

At step A14, the fragmentation parameter associated to the selected index is retrieved.

The fragmentation parameters obtained at step A14 are the "Scan Density" parameter value and the "Logical Scan Fragmentation" parameter value. These fragmentation parameters are obtained by executing the DBCC SHOWCONTIG command for the table index.

At conditional step C1, a check is performed whether it is requested a mode of online index defragmentation YC1 or, instead, an offline index defragmentation mode is requested NC1.

An online defragmentation mode YC1 may be used when the database is in-use by some users and, instead, an offline defragmentation mode NC1 may be used when no user is connected to the database.

In case of online index defragmentation mode YC1, for each specified table of the list, depending C2 on the value of the "Logical Scan Fragmentation" value, the defragmentation of the associated index is performed by executing the DBCC INDEXDREFRAG command.

The index defragmentation command DBCC INDEXDREFRAG is executed YC2 when the "Logical Scan Fragmentation" value is found to be below a configurable threshold value comprised between circa 10% to circa 35%, e.g. circa 20%.

In case of offline index defragmentation mode NC1, for each specified table of the list, depending C3 on the value of the "Scan Density" value, the defragmentation of the associated index is performed by executing the DBCC DBREINDEX command.

The DBCC DBREINDEX index defragmentation command is executed YC3 when the "Scan Density" value is found to be above a configurable threshold value disposed between circa 55% to circa 85%, e.g. circa 70%.

After the index defragmentation command is executed for a whole table, also the statistics may be rebuilt by executing the command UPDATE STATISTICS <tablename>, not shown in the FIGURE. Having up to date statistics is important since the table statistics are used to determine the optimal strategy for evaluating a query by the SQL Server query optimizer to estimate the cost of using a given index for a query.

In case the fragmentation parameter conditional checks C3, C4 return false NC2, NC3, the following index of the list index is selected.

At conditional check C4, it is checked whether end of index list is reached. In case end of index list check C4 returns false NC4, a new iteration is performed starting from step A14. In case end of index list check C4 returns true YC4, the following table of the table list is selected at step A16.

At conditional check C5, it is checked whether end of table list is reached. In case end of table list check C5 returns false NC5, a new iteration is performed starting from step A12. In case end of index list check C4 returns true YC4, the algorithm ends END since all tables with all their indexes have been processed.

In an embodiment of the present invention, at startup of the index defragmentation algorithm, the user may be entitled to choose whether to perform an online index defragmentation or an offline index defragmentation.

Online defragmentation does not hold locks long term and thus does not block running queries or updates. On the contrary, offline defragmentation holds locks long term and thus does block running queries or updates. A lock is a restriction on access to a resource in a multi-user environment. SQL Server locks users out of a specific row automatically to maintain security or prevent concurrent data modification problems.

Hence, in an online index defragmentation mode, the tables and indexes are advantageously available to the user while the index is being defragmented. Instead, in an offline defragmentation mode all users are disconnected from the database and after the physical reorganization of the index page the statistics are conveniently rebuilt.

In another embodiment of the present invention, a SQL Server system may be giving the choice to schedule an online index defragmentation with at certain times with a certain periodicity, e.g. daily or weekly, and to schedule the offline index defragmentation mode with other times and periodicity, e.g. at nights, weekly or monthly.

The invention claimed is:

1. A non-transitory computer-readable medium having computer-executable instructions stored thereon for performing a method for defragmenting indexes in a relational Microsoft SQL database, the relational database having a set of tables, in which each table has a set of indexes, and in which, for each index, a "Scan Density" parameter and a "Logical Scan Fragmentation" parameter are associated indicating fragmentation levels of the index, when the computer-executable instructions are loaded into a computer memory, the computer-executable instructions performing the following steps:
   a) getting a list of the set of tables from an INFORMATION_SCHEMA.TABLE SQL server system view;
   b) for each table of the list, getting the "Scan Density" parameter and the "Logical Scan Fragmentation" parameter associated with each of the indexes of the table by executing a "DBCC SHOWCONTIG" command;
   c) in case of an online index defragmentation mode, scheduled at certain times with a certain periodicity, depending on a value of the "Logical Scan Fragmentation" parameter, for each of the indexes of each of the tables, defragmenting an associated index by executing a "DBCC INDEXDEFRAG" command; and
   d) in case of an offline index defragmentation mode, scheduled at other times and with other periodicity, for each of the indexes of each of the tables, depending on a value of the "Scan Density" parameter, defragmenting the associated index by executing a "DBCC DBREINDEX" command.

2. The non-transitory computer-readable medium according to claim 1, wherein the relational database is a Microsoft SQL Database.

3. The non-transitory computer-readable medium according to claim 2, wherein the "Logical Scan Fragmentation" parameter is obtained by executing a "DBCC SHOWCONTIG" command.

4. The non-transitory computer-readable medium according to claim 3, wherein in the step c) the "Logical Scan Fragmentation" parameter value is greater than a threshold value between 10% and 35%.

5. The non-transitory computer-readable medium according to claim 1, which further comprises in step c), setting the "Scan Density" parameter value to be lower than a threshold value between 55% and 85%.

6. The non-transitory computer-readable medium according to claim 1, which further comprises, after all the indexes of one selected table have been checked, updating table statistics by executing an "UPDATE STATISTICS" command.

* * * * *